Feb. 24, 1931. N. SKILLMAN 1,793,874
SELF ALIGNING SELF LUBRICATING BEARING AND METHOD OF FORMING THE SAME
Filed April 19, 1928

INVENTOR.
BY NEWTON SKILLMAN
ATTORNEY.

Patented Feb. 24, 1931

1,793,874

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

SELF-ALIGNING SELF-LUBRICATING BEARING AND METHOD OF FORMING THE SAME

Application filed April 19, 1928. Serial No. 271,379. REISSUED

This invention relates to a self-aligning self-lubricating bearing and method of forming the same. It has to do particularly with an extremely simple and compact bearing for supporting and automatically aligning cross brake shafts for automobile chassis frames, although it is not in any way restricted thereto.

In the past, considerable difficulty has been experienced in aligning the bearings and cross brake shafts for automobile frames or the like due to inaccuracies in initial fabrication and assembly. Attempts have been made to design bearings to take care of this inaccuracy of alignment, but such attempts have involved complicated and expensive bearing supports, and particularly so with bearing supports of the self-aligning self-lubricating type.

It is the object of the present invention to provide an extremely compact, adjustable, self-aligning bearing member for rotatable shafts comprising an inner bearing member of substantial spherical shape and having a self-lubricating bushing directly receiving and supporting a rotatable shaft, and a second spherical bearing member also having a self-lubricating bushing for resiliently and adjustably supporting the main spherical bearing member, the said outer spherical bearing member being preferably formed integrally with a supporting plate for the entire unit.

Another important feature of the present invention relates to the method of fabricating and forming this complete unit, wherein the outer spherical bearing member is initially formed from a cylindrical tubing, the inner spherical bearing member, the lubricant impregnated fibrous material between the two bearing members and the supporting plate all being positioned centrally of this tubing, and said tubing stamped or formed into a substantial spherical shape locking said central bearing member in position and being integrally secured to said supporting plate in one operation. Other important features as to structure and method will be brought out in the specification and claims.

The present invention relates primarily to the forming of a self-lubricating self-adjusting bearing member in a single integral unit whereby it may be directly mounted and assembled upon an automobile chassis frame or other place with a minimum of time and expense. It is believed that the invention and the article may be best illustrated by first describing the method of fabrication and assembly.

The main bearing part in my complete bearing assembly preferably consists of a spherical bearing which may be designated 1 and which is preferably spherical in shape and formed from a piece of straight cylindrical tubing. This spherical bearing member is provided on the interior thereof with compressed lubricant impregnated fibrous material 2 which is rigidly expended and compressed into shape with the forming of the bearing member 1, whereby to directly receive and support a rotatable shaft or other element. This bushing 2 being resilient and of lubricant impregnated fibrous material will thoroughly and continuously lubricate the shaft being supported and will also, due to its resiliency, wear for an unusually long time.

Figure 1:
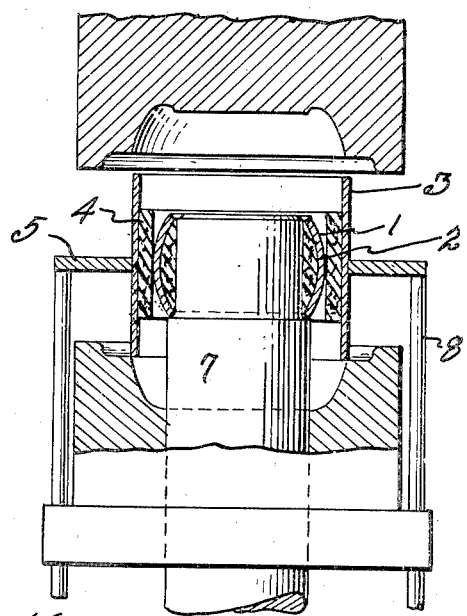
Fig. 1 is a diagrammatic view, partly in section, illustrating the first step in the preferred method of forming my novel bearing.

In assembling a completed bearing, I preferably utilize a piece of straight cylindrical metallic tubing 3, which is of predetermined diameter and length, and also of comparatively thin walls. Within this tubing 3, as shown in Fig. 1, I place a strip of woven fabric 4 impregnated with a suitable lubricant. This strip 4 is formed from a flat straight strip cut to length. Inside of this strip 4 I next place the spherical bearing member 2 so that the strip 4 and the member 2 are preferably centrally positioned of the tube 3.

On the outside of the tubing 3 and approximately centrally thereof, as shown in Fig. 1, I position a supporting plate 5, such plate being provided with a suitable aperture for receiving the member 3. This entire assembly, as shown in Fig. 1, is compressed by suitable dies and formed into the shape shown in Fig. 2 in one operation. The tube 3 is formed into an outer bearing substantially spherical in shape, and is distorted as at 6 to lock the plate 5 into fixed central position. This complete fabrication and assembly of the unit in one operation may be accomplished in many different ways and in Figs. 1 and 2, I have diagrammatically illustrated one method of accomplishing the same.

In the particular embodiment shown, the bearing 1, the bushing 4, and the plate 5, are held centrally of the outer tubing 3 by means of a pilot 7 and locating pins 8. The upper and lower die members are then brought together to distort the tubing 3 into a substantially spherical shape, corresponding to the walls of the die members and to also collapse the same as at 6, whereby to positively secure the plate 5 centrally of the bearing.

Figure 2:
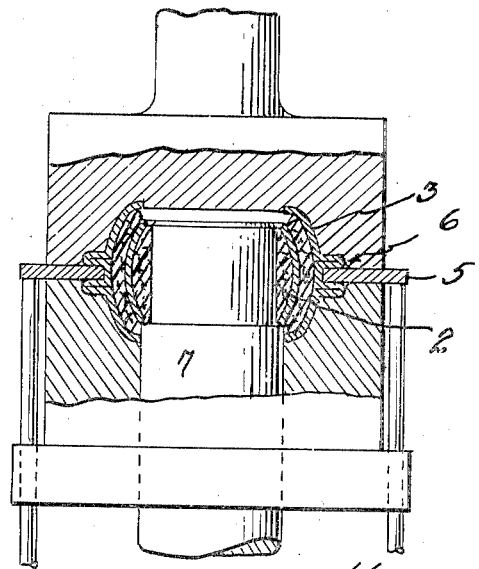
Fig. 2 is a view similar to Fig. 1 illustrating the final step, and showing the manner of distorting and forming the completed bearing in one operation.
Figure 3:
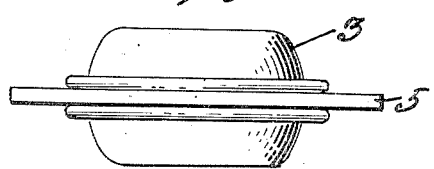
Fig. 3 is a detail view of the complete assembled bearing formed integrally with the supporting plate.
Figure 4:
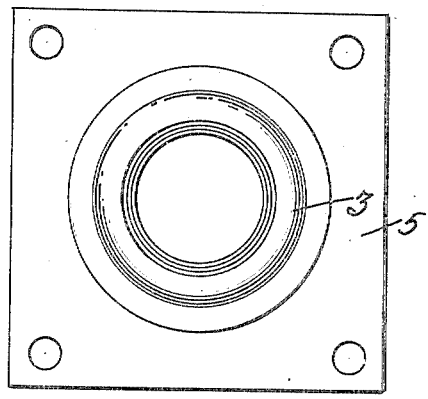
Fig. 4 is a plan view of the bearing shown in Fig. 3.
Figure 6:
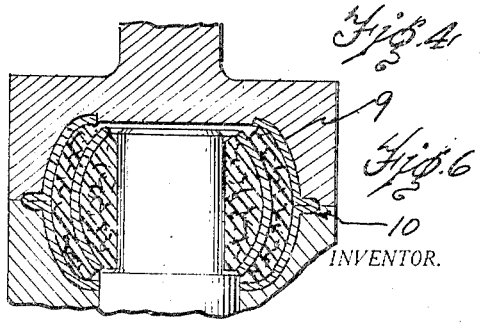
Fig. 6 is a view similar to Fig. 2 illustrating the final step of forming this modified bearing structure.

In Fig. 6 I have illustrated a somewhat modified form of self-aligning bearing, in that the outer casing 9 is collapsed as at 10 to form a central annular flange around the periphery of the spherical outer casing 9, instead of securing a plate in place as shown in Fig. 2. Otherwise this bearing member shown in Fig. 6 is identical with that shown in Fig. 2 and is fabricated and formed in substantially the same manner.

Figure 5:
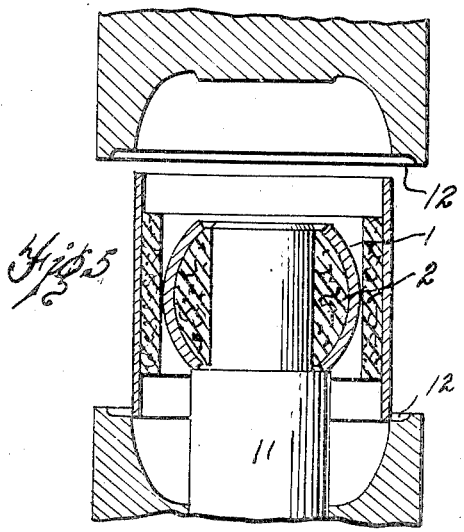
Fig. 5 is a view similar to Fig. 1 and illustrating a modified method of forming my novel bearing structure.

In Fig. 5 I have diagrammatically illustrated one form of die structure for forming this bearing and the same is provided with a locating and positioning pilot 11 and the upper and lower diameter thereof is substantially the same as that shown in Fig. 1, with the exception that the recessed portions 12 are of less depth.

It will thus be seen that I have provided a novel self-lubricating, self-aligning bearing structure which is very compact and simple in construction and which may be directly secured as a single unit to the frame of an automobile chassis or the like. In the embodiment shown in Fig. 2, the attaching plate forms a part of the bearing unit while in the embodiment shown in Fig. 6 the bearing unit is provided with an annular flange by which it may be readily secured and located in a suitable groove or by other attaching means. There are no split members or no other adjusting or attaching means necessary for securing this unitary aligning bearing in position.

It will further be obvious that the bearing is formed of materials which are extremely inexpensive and that such bearing is assembled and formed by a novel method in a single operation. The cylindrical tubing is stamped into shape and not only forms a substantially spherical outer unit but also locks the bearing member in adjustable position, compresses and positions the second layer of lubricant impregnated fibrous material around the inner bearing and either rigidly secures the supporting plate to the bearing or forms an annular flange to take the place thereof.

It will further by obvious that by my novel method of forming and assembling this bearing that I am able to initially use a flat woven strip of impregnated fibrous material which is automatically compressed into shape with the distorting of the outer shell or tubing.

What I claim is:

1. The method of forming self-lubricating, self-aligning bearings, which comprises inserting an inner spherical bearing member and an outer strip of lubricant impregnated compressible material within a cylindrical metallic member of predetermined length, and applying pressure to said cylindrical member to compress and shape said strip of material and form the member into substantially spherical shape in one operation.

2. The method of forming self-lubricating, self-aligning bearings, which comprises inserting an outer strip of lubricant impregnated fibrous material and an inner integral spherical bearing member within a cylindrical metallic member of predetermined length, then applying pressure to both ends of said member to compress and shape said strip into a substantially spherical bushing and collapse and form said cylindrical unit into a substantially spherical shape in one operation, and at the same time positively and adjustably locate said fibrous material and said spherical bearing member by said distorting action.

3. The method of forming self-lubricating, self-aligning bearings, which comprises inserting a spherical bearing member within a predetermined length of metallic tubing of uniform wall thickness, inserting a flat strip of lubricant impregnated fibrous material between said spherical member and said tubing, and then distorting the walls of said tubing into a substantially spherical shape to compress and shape the fabric around said spherical member and to positively locate and position said spherical member.

4. The method of forming self-lubricating, self-aligning bearings, which comprises inserting a bearing member and a strip of lubricant impregnated fibrous material within a substantially cylindrical metallic member of predetermined length, positioning a supporting plate on the outside of said cylindrical member and then applying pressure to said member to form the same into a substantial spherical shape to adjustably position and locate said bearing member and fibrous material by said spherical shaping action, and to distort a portion of the walls of said member to rigidly secure the said plate in position.

5. The method of forming self-lubricating, self-aligning bearings, which comprises inserting a bearing member and a strip of lubricant impregnated fibrous material within a substantially cylindrical metallic member of predetermined length, then applying pressure to both ends of said member to distort said member into a shape to lock and adjustably hold said bearing member in position therein, and to distort a portion of a wall of said member to form an annular ridge around the periphery thereof.

6. A self-lubricating, self-aligning bearing, comprising a substantially spherical bearing member, an integral bearing member substantially spherical in shape and partly enclosing said first bearing member, and an annular layer of lubricant impregnated material compressed between the said two bearing members whereby to adjustably hold and locate said first spherical bearing member within said second integral bearing member.

7. A self-lubricating, self-aligning bearing member, comprising as a single unit a spherical inner bearing member, a second bearing member of uniform wall thickness and also substantially spherical in shape partly enclosing said first bearing member, a strip of compressed lubricant impregnated fibrous material between the two members for resiliently and adjustably holding said first bearing member in position, said outer bearing member having a portion of its wall distorted to clamp and secure a supporting plate thereto.

8. A self-lubricating, self-aligning bearing member, comprising as a single unit a spherical inner bearing member, a second bearing member of uniform wall thickness and also substantially spherical in shape partly enclosing said first bearing member, a strip of compressed lubricant impregnated fibrous material between the two members for resiliently and adjustably holding said first bearing member in position, said outer bearing member having a portion of its wall distorted to form an annular flange to assist in securing the entire bearing member as a unit to its support.

9. A self-lubricating, self-aligning bearing, comprising a substantially spherical inner bearing member adapted to be held in fixed longitudinal position, an integral, stamped sheet metal bearing member substantially spherical in shape and partly enclosing said first bearing member, and a layer of lubricant impregnated material substantially surrounding said inner bearing member and compressed between said two bearing members, said integral outer bearing member being shaped and positioned whereby to permanently lock and adjustably locate said first spherical bearing member in said second integral bearing member.

10. A self-lubricating, self-aligning bearing, comprising a substantially spherical inner bearing member adapted to be held in fixed longitudinal position, an integral bearing member substantially spherical in shape and partly enclosing said first bearing member, and an annular layer of lubricant impregnated fibrous material compressed between said two bearing members, said integral outer bearing member being shaped and positioned whereby to permanently lock and adjustably locate said first spherical bearing member in said second integral bearing member, said outer bearing member having a portion of its wall distorted to form an annular flange to assist in securing the entire bearing member as a unit to its support.

11. The method of forming self-lubricating, self-aligning bearings, which comprises inserting a bushing of compressible material within an outer bearing having a portion of its length substantially cylindrical in shape, inserting a non-cylindrical bearing member within said bushing whereby said bushing is spaced between the inner bearing member and the outer bearing member, and then distorting the cylindrical walls of said outer member to form an outer bearing substantially spherical in shape, said distorting of said cylindrical portion of the outer member serving to compress and shape the bushing around the inner non-cylindrical member and to positively locate and position said inner member.

12. The method of forming self-lubricating, self-aligning bearings, which comprises positioning a bearing unit having a substantially spherical outer surface and a lining of compressible material within a sheet metal outer bearing member, and then distorting the walls of said sheet metal outer member to shape the same and to simultaneously shape and compress the material around the spherical surfaces of said inner bearing unit, the distorting of the outer sheet metal shell serving to lock the inner bearing in position, and said compressed bushing acting expansively against the outer bearing shell and the inner bearing unit.

13. The method of forming self-lubricating, self-aligning bearings, which comprises inserting a bearing unit having substantially spherical outer bearing surfaces and an outer lining of lubricant impregnated fibrous material within a substantially cylindrical metallic member of predetermined length, and then distorting the walls of said outer member whereby to positively shape said fibrous material and compress the same around the spherical walls of the inner bearing unit whereby the said inner bearing unit and the fibrous bushing are positively and permanently located within the distorted outer member and whereby said compressed fibrous material acts expansively against the inner unit and outer member.

14. A self-lubricating, self-aligning bearing, comprising an inner bearing unit having a lining for receiving a relatively movable member, the outer surface of said inner unit being substantially spherical in shape, an integral bearing member substantially spherical in shape and partly enclosing said first bearing unit, and an annular layer of lubricant impregnated fibrous material compressed between the substantially spherical surfaces of said inner unit and outer member, said integral outer bearing member being so shaped as to permanently lock and position said inner bearing unit within said integral outer member.

15. A self-lubricating, self-aligning bearing, comprising an inner bearing member having a surface of longitudinally varying contour, a sheet metal outer bearing member substantially spherical in shape, and an annular layer of lubricant impregnated material compressed between the surfaces of said two bearing members, said outer sheet metal bearing member having a portion of its surface permanently distorted whereby to adjustably but permanently lock the inner bearing member in position and to maintain said fibrous material under compression.

16. A self-lubricating, self-aligning bearing, comprising an inner bearing member having a surface of longitudinally varying contour, a sheet metal outer bearing member substantially spherical in shape, a bushing of compressible material substantially surrounding said inner member and compressed between the surfaces of said two bearing members, said outer sheet metal bearing member being integrally formed and permanently shaped whereby to maintain said bushing under compression and permanently but adjustably lock the inner bearing member in position.

In testimony whereof I affix my signature.

NEWTON SKILLMAN.